(12) United States Patent
Takegoshi

(10) Patent No.: US 6,744,019 B2
(45) Date of Patent: Jun. 1, 2004

(54) ELECTRIC COOKING APPARATUS

(75) Inventor: Takao Takegoshi, Tsubame (JP)

(73) Assignee: K. K. Takegoshi Seisakusho, Niigata-Ken (JP)

( * ) Notice: Subject to any disclaimer, the term of this patent is extended or adjusted under 35 U.S.C. 154(b) by 0 days.

(21) Appl. No.: 10/135,529

(22) Filed: May 1, 2002

(65) Prior Publication Data

US 2003/0173350 A1 Sep. 18, 2003

(30) Foreign Application Priority Data

Mar. 13, 2002 (JP) ........................................ 2002-068137

(51) Int. Cl.[7] ........................ A47J 36/20; A47J 27/00; H05B 1/02; A23L 1/10
(52) U.S. Cl. ...................... 219/492; 219/432; 219/433; 219/442; 99/333
(58) Field of Search ................................ 219/492, 429, 219/432, 433, 441, 442, 509; 99/331–333

(56) References Cited

U.S. PATENT DOCUMENTS

| | | | | | |
|---|---|---|---|---|---|
| 4,304,177 A | * | 12/1981 | Loeffler et al. | ................ | 99/333 |
| 4,309,584 A | * | 1/1982 | Terakami | .................... | 219/492 |
| 4,345,145 A | * | 8/1982 | Norwood | .................... | 219/492 |
| 4,438,324 A | * | 3/1984 | Narita et al. | ................ | 219/441 |
| 5,111,026 A | * | 5/1992 | Ma | .............................. | 219/492 |
| 5,573,691 A | * | 11/1996 | Yoshida et al. | ............. | 219/492 |
| 5,643,485 A | * | 7/1997 | Potter et al. | ................. | 219/621 |
| 5,746,114 A | * | 5/1998 | Harris | .......................... | 99/331 |
| 6,274,847 B1 | * | 8/2001 | Hlava et al. | ................. | 219/433 |
| 6,283,014 B1 | * | 9/2001 | Ng et al. | ....................... | 99/332 |
| 6,362,459 B1 | * | 3/2002 | Schmidt | ...................... | 219/435 |

FOREIGN PATENT DOCUMENTS

| | | | |
|---|---|---|---|
| CH | 688458 | * | 9/1997 |
| FR | 2633482 | * | 12/1989 |
| JP | 10117713 | * | 5/1998 |
| JP | 3165380 | | 5/2001 |

* cited by examiner

Primary Examiner—Joseph Pelham
(74) Attorney, Agent, or Firm—Greenblum & Bernstein, P.L.C.

(57) ABSTRACT

An electric cooking apparatus can be used for many purposes and includes heating programs and a control device. The heating programs can be changed freely through the operation of an operation panel. The heating temperature and time can be programmed according to a user's taste and are set and stored as a heating program, thereby making it possible to cook various ways. The setting of the heating program is carried out through the operation of the operation panel making the program setting extremely simplified. The control device is provided with a storage device for storing the heating programs set through the operation of the operation panel.

2 Claims, 5 Drawing Sheets

FIG. 3
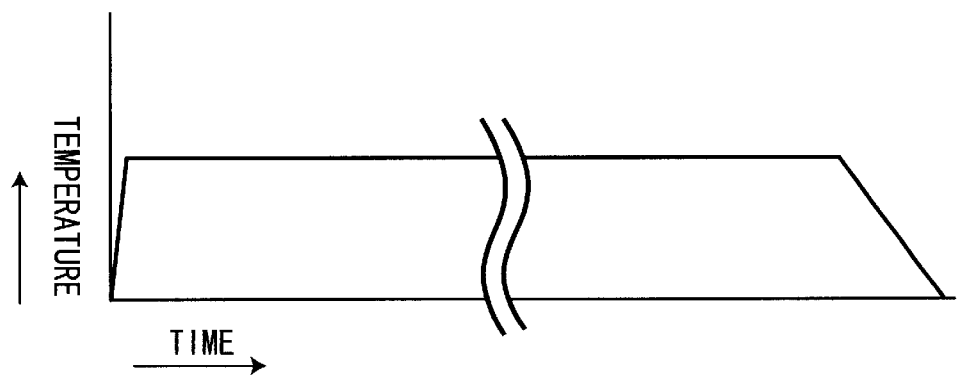
FIG. 3 (A)
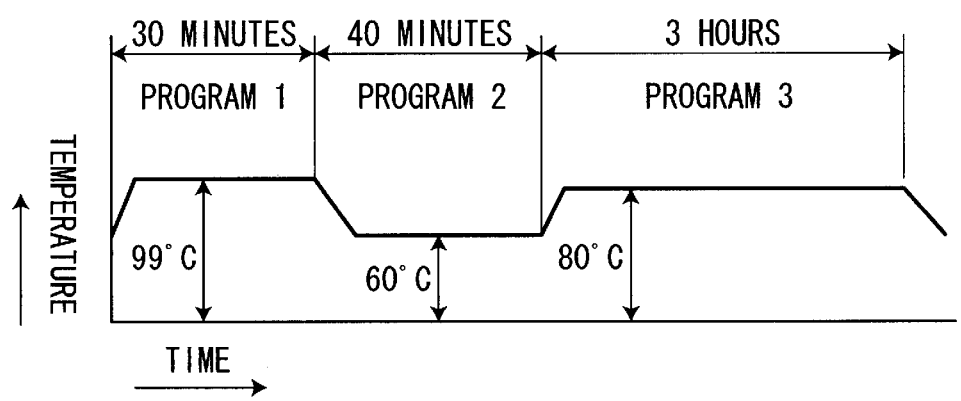
FIG. 3 (B)

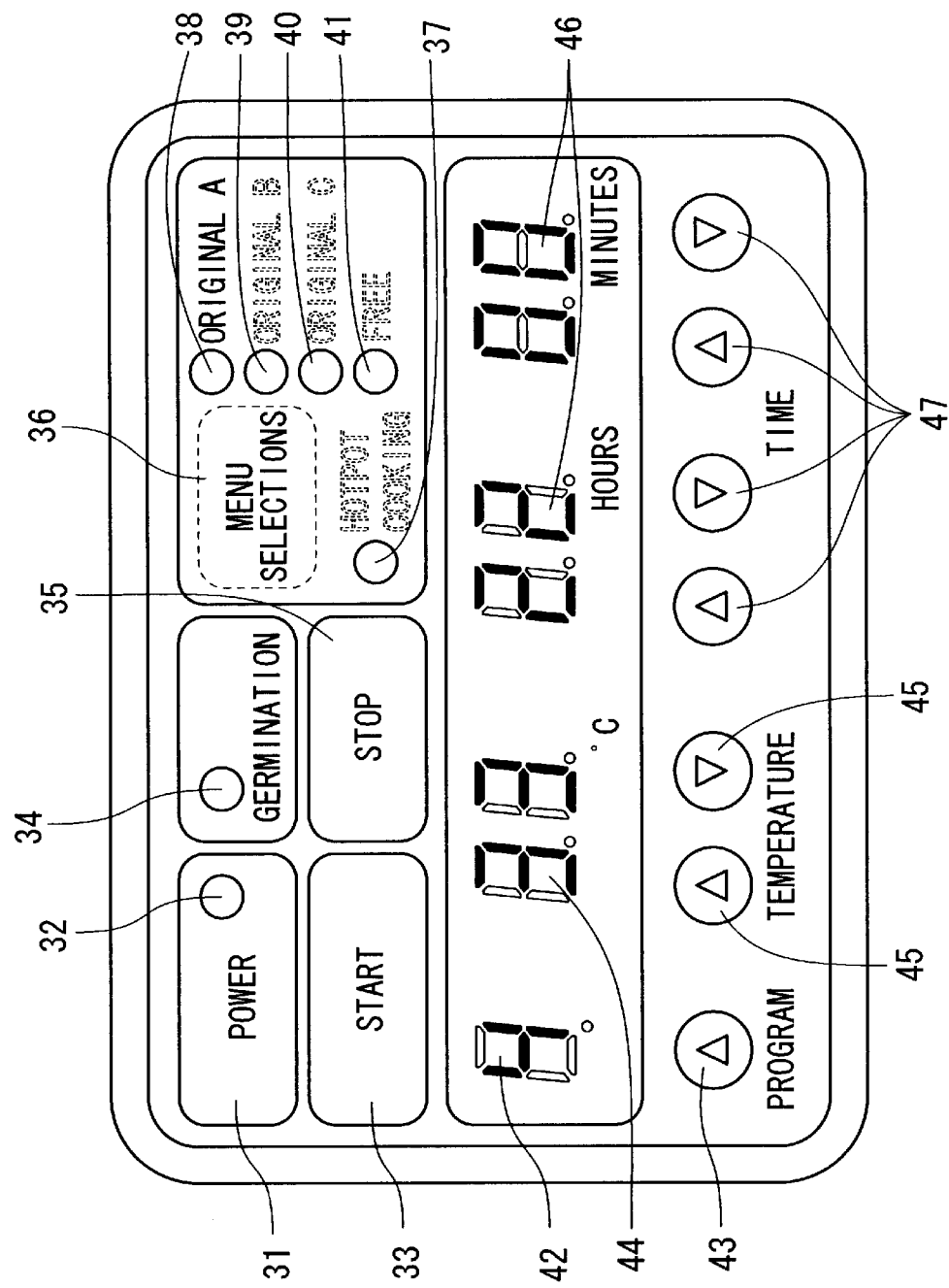

ELECTRIC COOKING APPARATUS

BACKGROUND OF THE INVENTION a) Field of the Invention

The present invention relates to an electric cooking apparatus with a control means.

b) Prior Art

Conventional electric cooking apparatus with a control means have been designed according to respective dedicated application. For example, electric rice cookers have had dedicated heating programs only for cooking rice, said dedicated heating programs being stored beforehand in such control means, and electric germinators also have had dedicated heating programs only for germinating unmilled, brown rice, said dedicated heating programs also being stored beforehand in such control means. Accordingly, it was impossible for users to set such dedicated heating programs as they like. For this reason, it was impossible to use conventional electric cooking apparatus designed for respective exclusive uses for other cooking uses, such as for boiling eggs or boiling Japanese "oden" (i.e., Japanese hotchpotch). Further, it was also impossible for users to cook as they like according to their favorite recipes or recipes created by famous cooks.

SUMMARY OF THE INVENTION

Accordingly, it is a main object of the present invention to provide an electric cooking apparatus which can be used for multi-purposes.

To attain the object, there is provided an electric cooking apparatus in accordance with a first aspect of the invention, comprising: a main body including a heating device; a control device for controlling heating temperature and time of the heating device based on a heating program; an operation panel for operating the control device; and a receptacle provided in the main body, the receptacle being heated by the heating means, wherein the heating program of the control device is able to be set arbitrarily by operating the operational panel.

Accordingly, the heating program can be set freely through the operation of the operation panel so that a multi-purpose electric cooking apparatus can be provided by setting the heating temperature and time as heating program according to a user's taste. Further, as the setting of the heating program is carried out only through the operation of the operation panel, the setting of heating program is simplified.

According to a second aspect of the invention, there is provided an electric cooking apparatus according to the foregoing aspect, wherein the control device includes a storage device for storing the heating program set through the operation of the operation panel.

Accordingly, it is possible to store the heating program by way of the storage device so that the stored heating program can be precisely repeated.

According to a further aspect of the invention, there is provided an electric cooking apparatus according to any of the foregoing aspect, wherein the storage device is so structured that it may have a plurality of the heating programs stored thereon, while the operation panel is provided with a selection operating portion for selecting among the stored heating programs.

Accordingly, it is possible to easily repeat or reproduce any one of the stored heating programs.

According to a still further aspect of the invention, there is provided an electric cooking apparatus according to any of the foregoing aspect, wherein the main body is provided with a temperature detection device for detecting temperature in the receptacle or in foods to be heated, with the temperature detection means connecting with the above-mentioned control device.

Accordingly, it is possible to perform cooking while feeding back a heat condition to the control device.

BRIEF DESCRIPTION OF THE DRAWINGS

Other objects, features and advantages of the invention will be apparent to those skilled in the art from the following description of the preferred embodiments of the invention, wherein reference is made to the accompanying drawings, of which:

FIG. 3 is a graph showing a heating control by a control means of the electric cooking apparatus of FIG. 1, in which FIG. 3 (A) is a graph showing the heating control in the case of a hotpot cooking, while FIG. 3 (B) a graph showing that in the case of programmed cooking.

FIG. 5 is a front view of an operation panel of an electric cooking apparatus in accordance with another embodiment of the invention.

DESCRIPTION OF PREFERRED EMBODIMENTS

Hereinafter is described a preferred embodiment of the present invention with reference to attached drawings.

Figure 1:
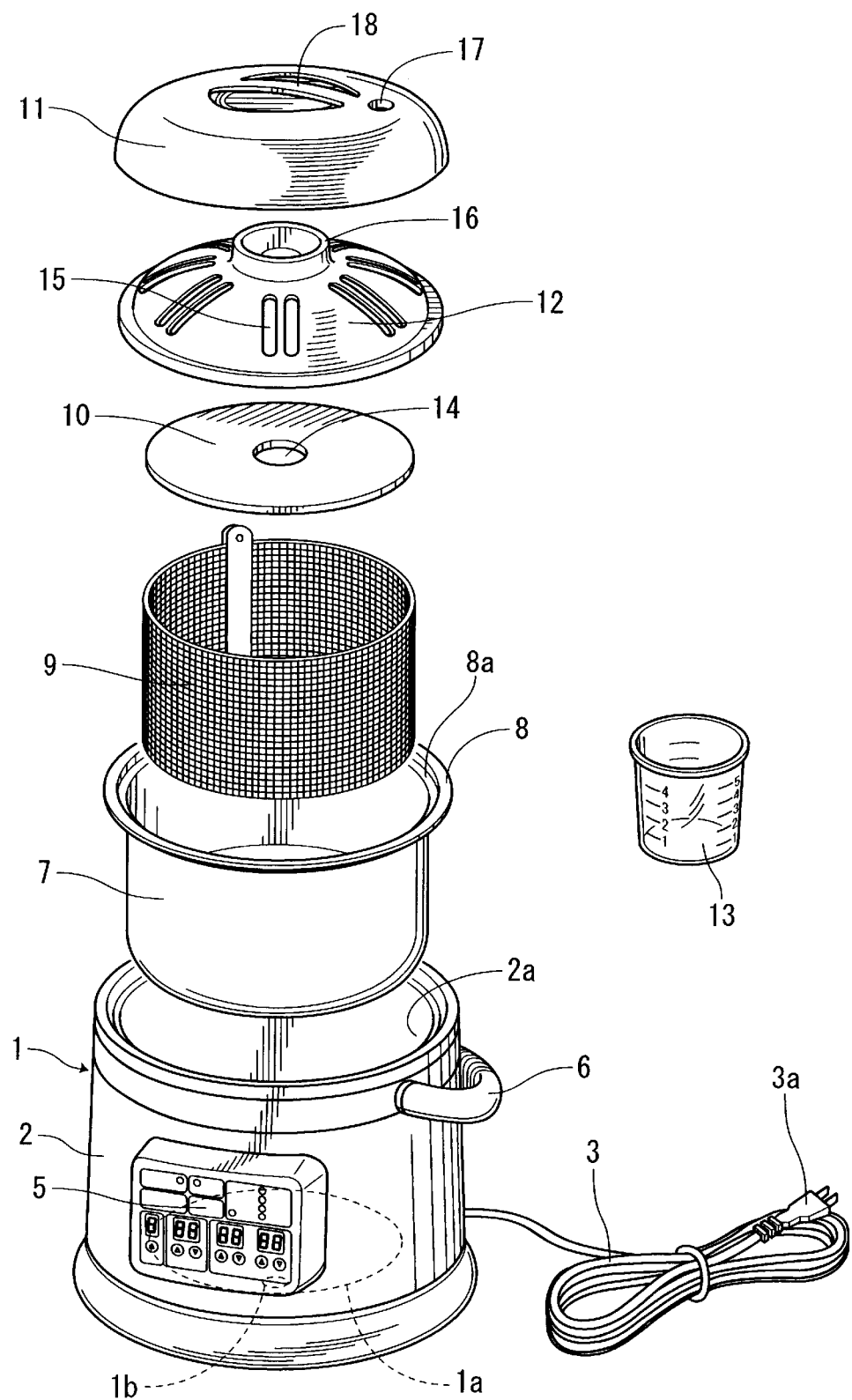
FIG. 1 is a perspective view showing an electric cooking apparatus in accordance with an embodiment of the invention.

First, the general structure of the invention will be explained with reference to FIG. 1, in which reference numeral 1 designates a main body, while numeral 2 a body case serving as an outer casing made of synthetic resin. The body case 2 is substantially cylinder-shaped, with a top side being opened and a bottom side being closed. Inside the body case 2 is provided an inner wall portion 2a made from metal such as aluminum, said inner wall portion 2a being integrally formed with the body case 2. The main body 1 includes a heater 1a as a heating means provided on a bottom portion inside the same. The heater 1a is composed of a sheathed lead, which alternatively may be structured by an electromagnetic induction heating system.

On a lower side of the body case 2 is provided an electric power code 3 for supplying an AC 100V commercial electric power from a socket (not shown) to the main body 1. An electric plug 3a is provided on a tip end of the power code 3.

Inside the body case 2 is provided a control means 4 which comprises a micro computer. The control means 4 is so structured that the heating temperature and time of the heater 1a may be controlled, according to a heating program. In the center of the bottom inside the body case 2 is provided a temperature detection means 1b, which is allowed to contact a bottom of a hereinafter-described inner pot 7 serving as a receptacle so as to detect the temperature in the inner pot 7, i.e., the temperature of foods to be heated so that the temperature thus detected may be transmitted to the control means 4. The control means 4 is connected to the heating program and the temperature detection means 1b so that an electric power to be supplied to the heater 1a may be controlled based on the temperature thus detected by the temperature detection means 1b.

An operation panel 5 for operating the control means 4 is provided in the center of a side surface of the body case 2. Through the operation of the operation panel 5, the heating program of the control means can be arbitrarily set or changed. A handle 6 for carrying the main body 1 is provided at a top side on the side surface of the body case 2.

On the heater provided in the bottom of the body case 2 is removably provided the inner pot 7 made of a material with good heat conductance, such as aluminum. The inner pot 7 is cylinder-shaped, with an opened top and a closed bottom. A flange portion 8 is integrally formed with the upper end of the inner pot 7, said flange portion 8 protruding outwardly in the substantially horizontal direction. The inside of the flange portion 8 is formed with a step 8a formed concavely downward. The inner surface of the inner pot 7 is fluoro-resinated to prevent cooked foods from burning and sticking thereto. The inner pot 7 is so structured that it may be entirely accommodated into the inside of the body case 2. This way, the inner pot 7 attached to the inside of the body case 2 is heated due to the bottom thereof contacting the heater.

Further, the electric pot of the invention further includes a germinating copper frame 9 for germinating brown rice, a germinating small lid 10, a lid 11, a gruel lid 12 for boiling rice into gruel, a measuring cup 13 for measuring brown rice or the like.

The germinating copper frame 9 is made of a mesh material that is made from pure copper, the whole portion of which is accommodated into the inner pot 7. Alternatively, the germinating copper frame 9 may be a pure titanium copper plate with a plurality of small holes punched to thereby form a so-called pure-copper punching metal, which is further formed substantially cylindrical. By using this germinating copper frame when germinating brown rice, the emission of bad smell associated with the germination of brown rice can be prevented due to the anti-bacterial effect of pure copper, as disclosed in Japanese Registered Patent Publication No.3165380.

The germinating small lid 10, which is to be placed directly on foods, is formed of a pure copper round plate, having a hole 14 in the center thereof, with an outside diameter thereof being slightly smaller than an inner diameter of the germinating copper frame 9. By using the germinating small lid 10 when with an outside diameter thereof being slightly smaller than an inner diameter of the germinating copper frame 9. By using the germinating small lid 10 when germinating brown rice, the emission of bad smell associated with the germination of brown rice can be prevented due to the anti-bacterial effect of pure copper, The gruel lid 12 is made of synthetic resin, having a plurality of slit holes 15 arranged radially, with a pickup portion 16 formed in the center thereof. This gruel lid 12 is provided so as to rest on the step portion 8a inside the flange portion 8 of the inner pot 7.

The lid 11 is also made of synthetic resin, structured such that it may rest on the body case 2. Inside the lower part of the lid 11, is provided an disc-shaped inner lid (not shown) made of metallic material such as aluminum or stainless steel in such a manner detachable from the aforesaid lid 11. This inner lid is so structured that it may rest on the step portion 8a inside the flange portion 8 of the inner pot 7. A vapor hole 17 is provided as a through-hole defined from the upper surface of the lid 11 through the lower surface of the inner lid, while the center of the top portion of the lid 11 is formed with a grip 18 for picking up the lid 11.

Figure 2:
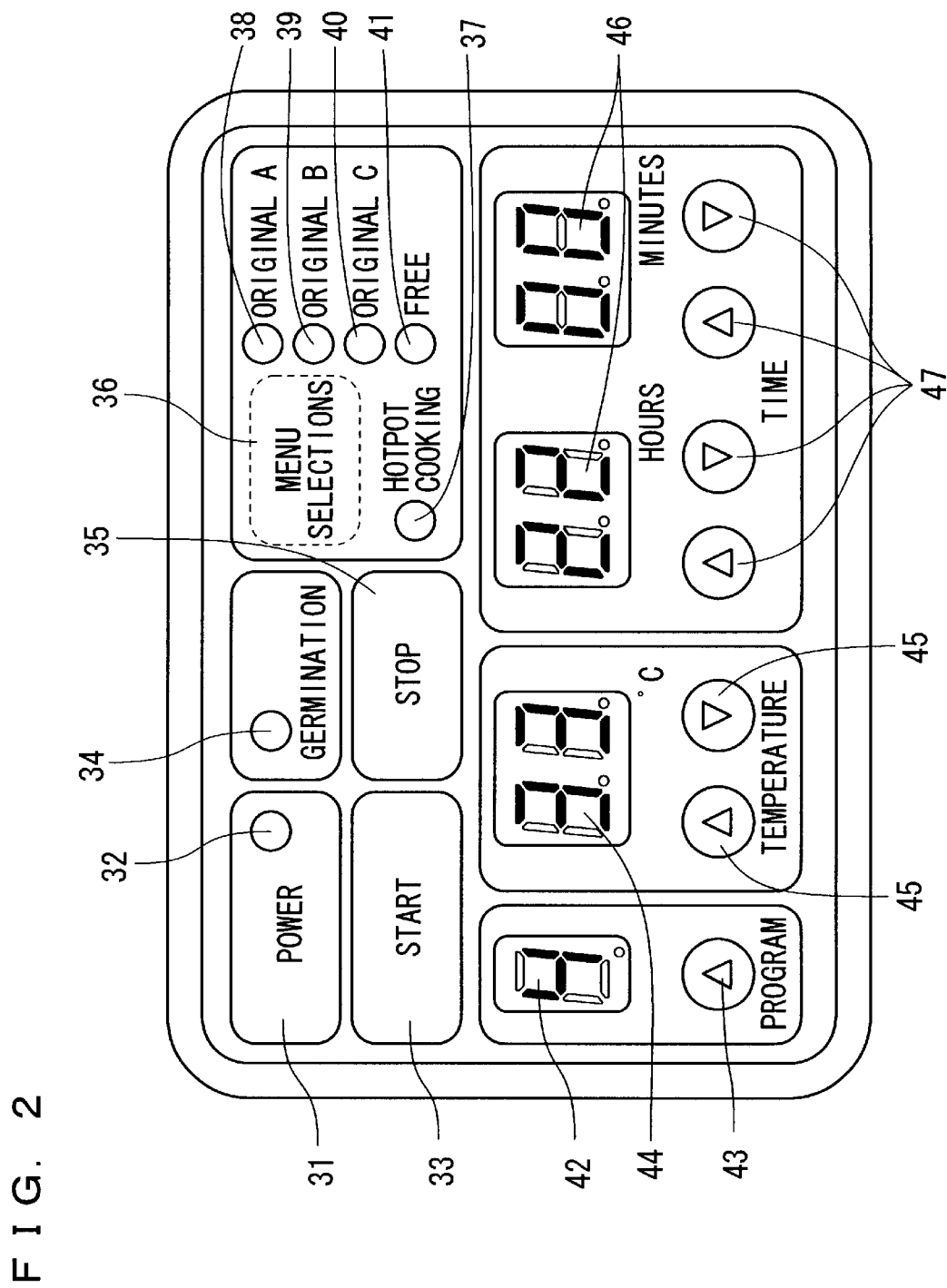
FIG. 2 is a front view showing an operation panel of the electric cooking apparatus of FIG. 1.
Figure 4:
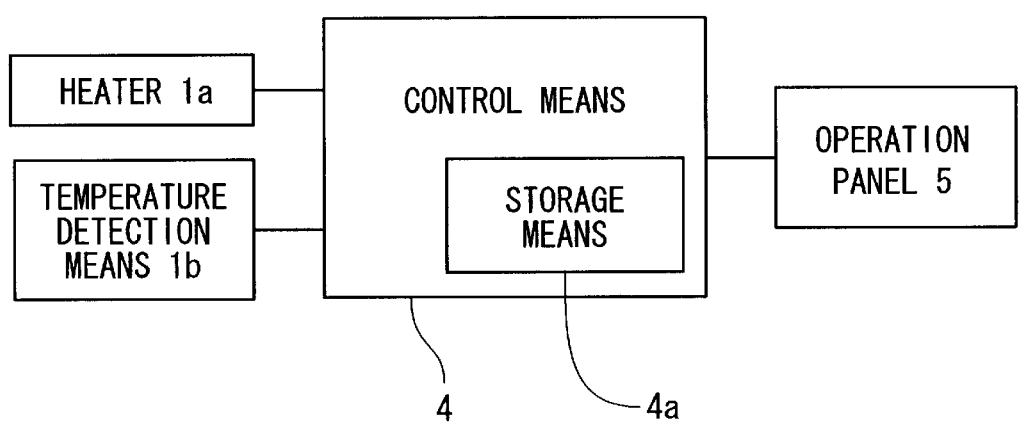
FIG. 4 is a block diagram of the electric cooking apparatus of FIG. 1.

Next, the structure of the operation panel 5 is explained with reference to FIG.2. Reference numeral 31 designates a push-button switch, which is pushed to turn on a power indication light 32. Reference numeral 33 designates a start button, which is pushed to start cooking. Numeral 34 designates a germination light, which is flickered by pushing the push button switch 31 and turned on by pushing the start button 33. Numeral 35 designates a stop button, which is used to stop cooking, or to store a specific heating program for a specific cooking condition set by a user, i.e., heating temperature and time, on the control means. Numeral 36 designates a menu selection button. Every time the menu selection button 36 is pushed, a hotpot selection light 37, an original cooking A selection light 38, an original cooking B selection light 39, an original cooking C selection light 40, and a free cooking selection light 41 are turned on in sequence, so that desirable cooking menu can be selected.

Reference numeral 42 designates a program display window serving as a display of a program selected. The program display window 42 displays the program number of the heating program that was set. By pushing a program button 43, the heating program number is switched. Numeral 44 designates a temperature display window serving as a display portion of temperature, which displays the temperature set or changed by means of a temperature button 45. Numeral 46 designates a timer display window for displaying the time set or changed by means of a timer button 47.

Next, the action of the electric cooking apparatus according to the foregoing embodiment will be described.

In the event that germinated brown rice is to be produced, the inner pot 7 and the germinating copper frame 9 are set in predetermined positions of the main body 1 so that brown rice and water are put thereinto. Thereafter, the small lid 10 and the lid 11 are placed thereupon, while the electric power plague 4 is inserted into a socket. When the push-button switch 31 is pushed, the power light 32 is tuned on so that the germination light 34 is flickered, while the respective numerical values indicating the temperature and the time, such as 33 degrees centigrade and 22:00 (i.e., 22 hours and zero minutes), are flickered. At this moment, the numerical values displayed on the respective display windows can be changed to desirable values of heating temperature and time, by pushing the temperature button 45 and the timer button 47.

When the start button 33 is pushed, the apparatus bleeps or produces an electronic sound, and then, the flickering temperature display and time display are turned on. Thereafter, electric power to be supplied to the heater 1a is adjusted by the control means 4 based on the heating temperature and time that were preset through the heating program as well as the temperature detected by the temperature detection means, so that the heating is performed as programmed by the heating program. During the heating process, the timer display window displays the remaining heating time. If the heating is over and time display indicates 00:00 (zero hours and zero minutes), then an electronic sound is produced to let a user know the heating process is over.

It should be noted that the use of the germinating copper frame 9 made of pure copper and the germinating small lid 10 placed directly on foods when producing germinated brown rice are particularly advantageous in that anti-bacterial effect due to copper ion occurs so that germinated brown rice can be prevented from getting rotten during the heating process.

In the event that the electric cooking apparatus of the invention is used for cooking hotpot, the inner pot 7 is put into the main body 1 and then suitable cooking materials are placed into the inner pot 7. Thereafter, the lid 11 is placed on the materials according to need, while the electric plug 4 is inserted into a socket. Then, the push button switch 31 is pushed so that the power light 32 is turned on while the germinating light 34 is flickered. At the same time, temperature and hour indicating numbers such as "33" and "22:00" are flickered on the temperature display window 44 and the timer display window 46. At this moment, when the menu selection button 36 is pushed once, the hotpot light 37 is turned on so that the menu is switched to hotpot menu, with the temperature display window 44 flickeringly displaying "HI" which means the heating temperature is 100 degrees centigrade. By pushing the temperature button 45 and the timer button 47, the heating temperature and time can be changed as you like.

When the start button 33 is pushed, an electronic sound is produced while the temperature and the time displays which were flickered until then are turned on. The control means 4 controls an electric power to be supplied to the heater 1a based on the heating temperature and time programmed as the heating program and the temperature detected by the temperature detection means 1b, whereby the heating is performed as programmed.

FIG. 3 (A) shows a temperature-time relationship for hotpot cooking, During the heating process, the timer display window 46 indicates the remaining heating hours., and if the heating is over and the time display indicates 00:00 (zero hours and zero minutes), then an electronic sound is produced to let a user know the heating process is over.

When the stop button 35 is pushed during the heating process, the temperature and the time displays are flickered. By pushing the temperature button 45 and the timer button 47, the heating temperature and time can be changed.

In the meantime, by the suitable setting of the heating temperature and time under the hotpot menu, it is possible to make natto (Japanese fermented soybeans), yogurt, rice gruel as well, other than various hotpot cooking menus. Incidentally, when making rice gruel, the gruel lid 12 is placed on the inner pot 7.

Hereunder is a description of the electric cooking apparatus according to the invention, where the heating program comprises a series of several combinations of the heating temperature and time.

First, the inner pot 7 is put into the main body 1 and then suitable cooking materials are placed into the inner pot 7. Thereafter, the lid 11 is placed on the materials according to need, while the electric plug 4 is inserted into a socket. After pushing the push button switch 31, the menu selection button 36 is pushed once, so that the original cooking A selection light 38, original cooking B selection light 39, original cooking C selection light 40, or free cooking selection light 41 is turned on to select the original menu.

As follows is a description of the operation of the apparatus of the invention in the case that the heating program is set such that the heating is first performed for 30 minutes at 99 degrees centigrade, and then for 40 minutes at 60 degrees, and finally for 3 hours at 80 degrees.

First, the program button 43 is pushed to display "1" on the program display window 42. Then, the temperature button 45 and the timer button 47 are pushed to set the heating temperature and time at 99 (degrees) and 00:30 (30 minutes), respectively, which are stored on the control means by pushing the stop button 35. Subsequently, the program button 43 is pushed again to display "2" on the program display window 42. Then, the temperature button 45 and the timer button 47 are pushed to set the heating temperature and time at 60 (degrees) and 00:40 (40 minutes), respectively, which are stored on the control means by pushing the stop button 35. Thereafter, the program button 43 is pushed again, to display "3" on the program display window 42, and then, the temperature button 45 and the timer button 47 are pushed again to set the heating temperature and time at 80 (degrees) and 03:00 (3 hours), respectively, which are stored on the control means by pushing the stop button 35.

The electric cooking apparatus according to the present embodiment allows nine combinations of the heating temperature and time which can be freely set as a series of the heating programs. It should be noted herein that the apparatus of the invention is so structured that once a heating control program is stored on the control means, it remains stored unless it is cleared. Accordingly, if frequently used heating programs are set in advance as the original A menu, original B menu, original C menu, and etc., it can save a user the trouble of setting the heating program every time he uses. More specifically, the control means 4 is provided with a storage means 4a for storing a plurality of heating programs such as original A, B and C menus, while the said operation panel 5 is provided with the menu selection button 36 for selecting among such plurality of heating programs.

When the start button 33 is pushed, an electronic sound is produced while the temperature and the time displays which were flickered until then are turned on. The control means controls an electric power to be supplied to the heater based on the heating temperature and time programmed as the heating program and the temperature detected by the temperature detection means, whereby the heating is performed as programmed.

FIG. 3 (B) shows a temperature-time relationship for this case. The three step heating process is controlled such that the first heating is performed for 30 minutes at 99 degrees, and then the next heating for 40 minutes at 60 degrees, and the final heating for 3 hours at 80 degrees. During the heating process, the timer display window 46 indicates the remaining heating hours, and if the heating is over and the time display indicates 00:00 (zero hours and zero minutes), then an electronic sound is produced to let a user know the heating process is over.

When the stop button 35 is pushed during the heating process, the temperature and the time displays are flickered. By pushing the temperature button 45 and the timer button 47, the heating temperature and time as well as the combination thereof can be changed or added. For a heating program that should be cleared, it can be cleared by pushing the menu selection button 36 in order to select the menu to be cleared, and then pushing the stop button twice. Also, the temperature in the inner pot 7 and the elapsed time at that point can be displayed by pushing the menu selection button 36 during the heating process.

As is apparent from the foregoing, the electric cooking apparatus according to the present embodiment includes the main body 1 equipped with the heater as a heating means, the control means 4 for controlling the heating temperature and time of the heater based on the heating program, the operation panel 5 for operating the control means 4 and the inner port 7 which is detachable from the main body 1 and heated by the heater, wherein it is possible to make an arbitrary selection among heating programs of the control means, through the operation of the operation panel 5. With the structure thus made, the heating programs can be set as you like, so that it is possible to set the heating temperature and time as heating program according to a user's taste, whereby the present electric cooking apparatus can be used for general cooking purposes, regardless of the sort of cooking, such as for making the aforesaid "oden", boiled eggs, boiled beans, the aforementioned "natto", pot-steamed hotchpotch, stewed food, yogurt, fruit wine, ground meat rolled in cabbage, dough and "amazake"(Japanese sweet drink made from fermented rice). Further, as the heating program is set by the operation of the operation panel, the setting of the heating program is simplified.

Particularly the electric cooking apparatus of the present embodiment is advantageous in that as plural combinations of the heating temperature and the heating time can be set as a series of heating programs, repeatability of cooking is enhanced and thus a less failure is resulted, even for such cooking that needs complex control of temperature.

Moreover, as the storage means 4a is so structured that a plurality of the heating programs such as the original A menu, the original B menu, and the original C menu may be stored thereon, while the aforesaid operation panel 5 is provided with the menu selection button 36 for selecting among such plural menus, the specific heating program can be easily repeated through the selection of one of the plural menus. Additionally, as the main body 1 is provided with the temperature detection means 1b for detecting the temperature in the inner pot 7, said temperature detection means 1b connecting with the control means 4, cooking can be performed while feed backing the heat condition to the control means 4.

If it is not necessary to store any heating program, the free light 4 may be turned on when making the heating programs.

The present invention should not be limited to the foregoing embodiments, but may be variously modified within a scope of the invention. Although the above mentioned embodiments all relate to an electric cooking pot, the invention is applicable to any other electric apparatus such as an electric rice cooker, an electric hotplate or a boiled egg maker, as far as it is an electric cooking apparatus with a heating function. Further, the main body may include another temperature detection means for detecting temperature in foods to be heated in a receptacle.

As shown in FIG. 5, the aforesaid display windows such as the program display window, the temperature display window and the timer display window may be provided on a liquid crystal panel, respectively. In other words, the aforesaid separately provided hotpot selection light 37, original A selection light 38, original B selection light 39, original C selection light 40 and free selection light 41 may be replaced with a liquid crystal panel which is integrally provided with a hotpot selection display portion 37A, an original A selection display portion 38A, an original B selection display portion 39A, an original C selection display portion 40A and a free selection display portion 41A, such that the display on the liquid crystal panel may be switched in the order of "hotpot", "original A", "original B", "original C" and "free". Alternatively, the program display window 42, the temperature display window 44 and the timer display window 46 may be formed integrally with the liquid crystal display, as illustrated in FIG. 5.

Still also, the aforesaid original A selection light 38, original B selection light 39, original C selection light 40 may be replaced with a menu display window with digital representation so that a plurality of original menus can be recorded. Regarding the way of time display, it may display elapsed time instead of remaining time through a switch. Instead of using the foregoing cooking names such as original A, original B and original C, respective programs may be stored and repeated by giving any desired names, such as "recipe 1", "recipe 2", "recipe 3" and "recipe 4".

What is claimed:

1. An electric cooking apparatus which comprises:

a main body including a heater, the main body accommodates a copper germinating frame for germinating brown rice;

a controller that controls a heating temperature and an on time of said heater based on a heating program;

an operation panel that operates said controller, said operation panel being provided in the main body;

a receptacle provided in the main body, said receptacle being heated by said heater;

the main body being provided with a temperature detector for detecting temperature in one of said receptacle and in foods to be heated, said temperature detector being connected with said controller;

a program display that displays the program number of the heating program that was set;

a temperature display that displays the temperature set or changed; and a timer display that displays the time set or changed, wherein the heating program of said controller is set by operating said operational panel, wherein a storage is configured to store a plurality of the heating programs, and said operation panel is provided with a selector for selecting from among the stored heating programs, said selector allows the selection of a free heating program in which no heating program is stored and which is other than one of said plurality of heating programs stored by said storage, wherein said selector allows said plurality of heating programs stored by said storage to sequentially execute any of a plurality of combinations of heating temperature and time, and wherein said stored heating programs may be deleted.

2. An electric cooking apparatus according to claim 1, wherein a small copper germinating lid, which is to be placed directly on foods, is provided in said main body, said small copper germinating lid having an outside diameter slightly smaller than an inner diameter of said copper germinating frame.

* * * * *

UNITED STATES PATENT AND TRADEMARK OFFICE
CERTIFICATE OF CORRECTION

PATENT NO.    : 6,744,019 B2
DATED         : June 1, 2004
INVENTOR(S)   : T. Takegoshi et al.

It is certified that error appears in the above-identified patent and that said Letters Patent is hereby corrected as shown below:

Title page,
Item [56], References Cited, OTHER PUBLICATIONS, insert the following:
-- English Language Description of relevancy with respect to the present invention, of: JP03-165380 --.

Signed and Sealed this

Eighteenth Day of January, 2005

JON W. DUDAS
*Director of the United States Patent and Trademark Office*